United States Patent [19]

Tour et al.

[11] Patent Number: 5,310,532
[45] Date of Patent: May 10, 1994

[54] PURIFICATION OF FULLERENES

[75] Inventors: James M. Tour; Walter A. Scrivens; Peter V. Bedworth, all of Columbia, S.C.

[73] Assignee: University of South Carolina, Columbia, S.C.

[21] Appl. No.: 896,193

[22] Filed: Jun. 10, 1992

[51] Int. Cl.$^5$ .............................................. C01B 31/00
[52] U.S. Cl. ................................ 423/445 B; 423/461; 423/DIG. 39
[58] Field of Search .................... 423/445 B, DIG. 39, 423/DIG. 40, 461

[56] References Cited

FOREIGN PATENT DOCUMENTS 9204279  3/1992  World Int. Prop. O. .

OTHER PUBLICATIONS

Heftmann, *Chromatography*, 2d Ed., (1967) pp. 46–54.
Olsen, *Unit Processes and Principles of Chemical Engineering*, (1932) pp. 1–3.
Kirk–Othmer, *Encyclopedia of Chemical Technology* 3 ed., vol. 4, (1978) pp. 561–569.

*Primary Examiner*—Michael Lewis
*Assistant Examiner*—Stephen G. Kalinchak
*Attorney, Agent, or Firm*—Brumbaugh, Graves, Donohue & Raymond

[57] ABSTRACT

A low-cost and facile method of purifying fullerenes to obtain a preparation enriched in a fullerene of selected molecular weight using activated carbon involves adding a fullerene mixture to the top end of a column comprising activated carbon, passing a solvent in which the selected molecular weight fullerene is soluble through the column, and recovering a fraction enriched in the selected molecular weight fullerene from the bottom end of the column. In addition to activated carbon, the column may further comprise silica gel, diatomaceous earth, or other materials which aid in column packing and eluent flow.

14 Claims, No Drawings

PURIFICATION OF FULLERENES

This invention was made with the support of the United States Government under National Science Foundation Grant No. DMR-9158315 and Office of Naval Research Young Investigation Award N00014-89-J-3062. The Government has certain rights in this invention. This invention relates to a low cost and facile method for purification of fullerenes. This invention also relates to a composition of matter comprising a fullerene adsorbed onto a solid support comprising active carbon. The solid support may further comprise silica gel, diatomaceous earth, or other materials which aid in column packing and eluent flow.

BACKGROUND OF THE INVENTION

Fullerenes are carbon cages containing a central cavity. These molecules with the composition $C_{20+2m}$, where m is an integer, can take the stable form of hollow closed nets composed of pentagons and hexagons. The discovery of Buckminsterfullerene, a $C_{60}$ spherical allotrope of carbon, in 1985 by Kroto, H. W., Heath, J. R., O'Brien, S. C., Carl, R. F., Smalley, R. E.; "$C_{60}$: Buckminsterfullerene"; Nature, Vol. 318, November 1985, pp. 162-163 has precipitated a flurry of activity directed towards understanding the nature and properties of fullerenes, particularly their use as lubricants, semiconductors and superconductors. This research has been significantly hampered by the difficulty in obtaining gram or larger quantities of pure materials.

To date, fullerenes have been synthesized using a laser to ablate graphite, burning graphite in a furnace or by producing an arc across two graphite electrodes in an inert atmosphere. By impregnating graphite with metal salts or oxides, or conducting the vaporization in a metal containing atmosphere, a metal encapsulated in a fullerene can be synthesized. Other techniques applied to synthesize fullerenes include negative ion/desorption chemical ionization and a benzene flame. In each case, a soot comprising a mixture of $C_{60}$ and $C_{70}$ fullerenes, and even higher numbered carbon molecules is obtained. For example, carbon arc soot contains about 80-85% $C_{60}$, 10-15% $C_{70}$, and 5% higher fullerenes.

The first and still most commonly used method for purifying crude $C_{60}$ fullerene is by column chromatography on activity grade I neutral alumina using 5% toluene in hexane as the eluent. However, $C_{60}$ fullerene is only very slightly soluble in toluene/hexane (5/95) and this low solubility requires the use of large quantities of solvent and very large columns. The use of larger fractions of toluene in hexane afford no separation of $C_{60}$ from the higher fullerenes. Using this method to purify 500 mg of crude fullerenes requires large quantities of materials; 2500 g of alumina and about 12 liters of solvent making the process relatively expensive. Another disadvantage of this method is that alumina having a high activity, i.e., grade I alumina, tends to irreversibly adsorb $C_{60}$. During a typical separation procedure, only about 50% out of a possible 80% of $C_{60}$ present in the crude can be recovered. Purification using this method can take as long as 8-12 hours due to the large size of the columns necessary to purify 500 mg of crude fullerenes.

In another chromatographic method, powdered graphite has been used as the stationary phase. Vassallo, A. M.; Palisano, A. J.; Pang, L. S. K., Wilson, M. A.; "Improved Separation of Fullerene −60 and −70"; J. Chem. Soc., Chem. Comm., 1, pp. 60-61 (1992). Higher toluene concentrations (10% toluene in hexane) make it possible to use less solvent. However this method yields a poor recovery of $C_{60}$, typically giving only 32% pure $C_{60}$ as compared to a possible 80% yield.

Gel permeation chromatography (GPC) has also been used for $C_{60}$ purification. Meier, M. S., Selegue, J. P.; "Efficient Preparative Separation of $C_{60}$ and $C_{70}$ Gel Permeation Chromatography of Fullerenes Using 100% Toluene as Mobile Phase"; J. Org. Chem., 57, pp. 1924-1926 (1992). In this technique 100% toluene is the eluent. Since $C_{60}$ is more soluble in toluene than in toluene hexane mixtures, this technique has the advantage of requiring smaller solvent volumes. This method gives 50% recovery of $C_{60}$ out of a possible 80%, with the remaining $C_{60}$ eluting as an impure fraction that requires multiple re-injection and purification steps. The major disadvantages of this method are the need for an high pressure liquid chromatography (HPLC)/GPC apparatus, the tremendous cost of the separation columns, and the inapplicability for near gram scale separations.

Finally, a method of chromatographic purification of $C_{60}$ using multi-legged phenyl groups bound to silica gel as a stationary phase has been reported. Jinno, K., Kunihiko, Y., Takanori U., Hideo N., Kenji, I.; "Liquid Chromatographic Separation of All-Carbon Molecules $C_{60}$ and $C_{70}$ With Multi-Legged Group Bonded Silica Phases"; J. Chromatogr., 594, pp. 105-109 (1992). This method necessitates the utilization of custom-made stationary phases and has only been demonstrated for analytical scale separations, not for preparative purposes.

SUMMARY OF THE INVENTION

The present invention relates to a facile low-cost method of purifying a mixture of fullerenes to obtain a preparation enriched in a fullerene of a selected molecular weight comprising adding a fullerene mixture to the top end of a column comprising activated carbon, passing a solvent in which the selected molecular weight fullerene is soluble through the column, and recovering a fraction enriched in the fullerene of the selected molecular weight from the bottom end of the column. This invention also relates to a composition of matter comprising a fullerene adsorbed onto a solid support comprising activated carbon. The solid support may further comprise silica gel, diatomaceous earth, or other material that aids in the packing of the activated carbon stationary phase.

DETAILED DESCRIPTION OF THE INVENTION

In the present invention, a fullerene of selected molecular weight is separated from a mixture of fullerenes using a column of activated carbon. Fullerene includes any fullerene or fullerene derivative, including metal encapsulating fullerene derivatives or metallic fullerene endohedral complexes, metallic fullerene exohedral complexes, and substituted fullerene derivatives or fulleroids. The purified fullerene is eluted from the activated carbon by passing a solvent in which the pure fullerene is soluble through the activated carbon.

Suitable eluting solvents include aromatic, heteroaromatic and halogenated hydrocarbon solvents in which the fullerene is soluble. Suitable aromatic solvents include mesitylene, benzene, toluene, xylene and combinations thereof. Toluene is a preferred eluting solvent as it is less toxic than benzene and has a lower boiling point than xylene. Suitable solvents also include halogenated, preferably chlorinated, aromatics, alkyls, alkyenes, and alkynes, as well as perhalogenated carbons such as carbon tetrachloride. Suitable heteroaromatics contain sulfur, oxygen or nitrogen atoms, for example, pyridine.

Surprisingly, it has been found that activated carbon, an inexpensive and readily available material, provides for efficient separation of gram quantities of a fullerene of a selected molecular weight from a mixture of fullerenes. Typically, activated carbon has a surface area of $2 \times 10^4$ to $6 \times 10^4$ $cm^2$ per gram. Activated carbon is not pure carbon; many noncarbon elements are present and are attached to the carbon atoms by chemical bonds. During the activation process, carbonized raw material, for example charcoal, is oxidized using suitable gases. Activated carbon can be divided into two classes, polar (oxidized) and nonpolar (graphitized). Preferred activated carbons have a particle size of 37-841 $\mu$ (20-400 mesh) and lie in between the two polar and nonpolar classes. A most preferred activated carbon is alkaline Norit ®-A having a particle size greater than 149 $\mu$ (<100 mesh) available from Fisher Scientific Company, Pittsburgh, Pa.

In the present invention, activated carbon may be used alone or it may be used in combination with other materials, preferably nonreactive solids which aid in column packing and eluent flow. Preferred non-reactive solids include silica gel and diatomaceous earth. Preferably the ratio by weight of activated carbon to silica gel or activated carbon to diatomaceous earth is 1:2 or 1:1, respectively.

The purification method according to the invention can be carried out using inexpensive, easily assembled laboratory equipment such as a flash chromatography apparatus, as described by Still, W. Clark, Kahn, Michael, Mitra, Abhijct; "Rapid Chromatographic Technique for Preparative Separations with Moderate Resolution"; J. Org; Chem., Vol. 43, No. 14 pp. 2923-2925 (1978). Flash chromatography is a technique in which eluent solvent is driven through a chromatography column by applying a medium pressure, 5 to 10 p.s.i. of a gas.

In addition, the column can be run under gravity feed conditions at atmospheric pressure. Moreover, by using a column of a material which can withstand high pressures, for example stainless steel, high pressures up to 5000 p.s.i. can be applied to one end of the column.

EXAMPLE 1

Purification Using Activated Carbon 500 mg of crude $C_{60}$ was dissolved in 100 ml of toluene. This solution was poured onto the top of a standard 2 cm diameter, 50 cm long liquid chromatography column that had been slurry-packed with 12 grams of Norit ®-A and plugged at the bottom with cotton. The column was then pressurized to 10 p.s.i. with a nitrogen head pressure and eluted with toluene at the rate of 2 mL/min. Fractions were collected for the next 300 ml during which most of the $C_{60}$ had eluted as a deep purple solution. The fractions were combined and solvent was removed by rotary evaporation to give 375 mg of pure $C_{60}$. The material was characterized by mass spectrometry and $^{13}C$ NMR and was shown to be >95% pure.

EXAMPLE 2

Purification Using Activated Carbon And Silica Gel 500 mg of crude $C_{60}$ was dissolved in 100 ml of distilled toluene. This solution was poured onto the top of a standard 2 cm diameter, 50 cm long liquid chromatography column that had been slurry-packed with a mixture of 9 g Norit ®-A and 18 g flash chromatography grade silica gel, having a particle size of 37-63 $\mu$ (230-400 mesh), available from EM Science, in Gibbstown, N.J. While, silica gel aided in the packing of the column so that the fractions ran more quickly and evenly; numerous uniform solids could also be used for this purpose. The column was then pressurized to 10 p.s.i. with a nitrogen head pressure and eluted at the rate of 5 mL/min. Fractions were collected for the next 250 mL during which most of the $C_{60}$ had eluted as a deep purple solution. The fractions were combined and solvent was removed by rotary evaporation to give 333 mg of pure $C_{60}$. The material was characterized by mass spectrometry and $^{13}C$ NMR and was shown to be >95% pure.

In each of the above examples, not only is a high purity $C_{60}$ fullerene recovered, but a $C_{70}$ fraction containing some $C_{60}$ is eluted having a reddish-brown color. By rechromatographing this $C_{70}$ fraction over two columns, as described herein, an enriched $C_{70}$ fraction which is 3:1 by weight $C_{70}:C_{60}$ can be obtained.

A comparison of the time and expense required to purify one gram of Buckminsterfullerene according to the method of the present invention as compared to conventional methods is shown in Table 1. As can be seen from Table 1, the present invention provides a method for purification of fullerenes which gives a high recovery of pure fullerene from starting material at a low solvent and stationary phase cost, which is 24 to 96 times faster than other known purification methods.

TABLE 1

| Separation Material Technique | Cost of Eluent Solvent and Stationary Phase ($) | Starting Material Cost ($) | Amount (g) of Starting Material to Obtain 1 g of $C_{60}$ Fullerene | Time (Hrs) | Price Per Gram Purified Product ($) |
|---|---|---|---|---|---|
| [1]Alumina | 204 | 1,667 | 1.85 | 24+ | 1,871 |
| [2]Powdered Graphite | 72 | 2,812 | 3.125 | 12 | 2,884 |
| [3]Gel* Permeation | .35 | 1,062 | 1.18 | 48+ | 1,062 |
| [4,5]Alumina (Soxhlet Extraction) | 5 | 2,727 | 3.00 | 11 | 2,732 |
| | 31 | 2,093 | 2.33 | 30 | 2,124 |
| Example 1- Active Carbon | 2 | 1,197 | 1.33 | 4 | 1,199 |
| Example 2- Active Carbon/ | 2 | 1,359 | 1.51 | 0.5 | 1,361 |

TABLE 1-continued

| Separation Material Technique | Cost of Eluent Solvent and Stationary Phase ($) | Starting Material Cost ($) | Amount (g) of Starting Material to Obtain 1 g of $C_{60}$ Fullerene | Time (Hrs) | Price Per Gram Purified Product ($) |
|---|---|---|---|---|---|
| Silica Gel | | | | | |

[1] Wudl, F.; Koch, A. S.; Khemani, K. C. J. Org. Chem. 1991, 56, 4543
[2] Vassallo, A. M.; Palisano, A. J.; Pang, L. S. K.; Wilson, M. A. J. Chem Soc., Chem Comm. 1992, 1, 60
[3] Meier, M. S.; Selegue, J. P. J. Org. Chem. 1992, 57, 1924
[4] Chatterjee, K. et al. J. Org. Chem. 1992, 57, 3253
[5] Wudl, F.; Khemani, K. C.; Prato, M. J. Org. Chem. 1992, 57, 3253
*Solvent cost only

We claim:

1. A method of purifying a mixture of fullerenes to obtain a preparation enriched in a fullerene of a selected molecular weight comprising;
   adding a fullerene mixture to the top end of a column comprising activated carbon,
   passing a solvent selected from the group consisting of aromatics and halogenated hydrocarbons in which said selected molecular weight fullerene is soluble through said column, and
   recovering a fraction enriched in the fullerene of the selected molecular weight from the bottom end of the column.

2. A method according to claim 1 wherein said solvent is aromatic.

3. A method according to claim 2 wherein said aromatic solvent is selected from the group consisting of mesitylene, benzene, toluene, xylene, and combinations thereof.

4. A method according to claim 3 wherein said aromatic solvent is toluene.

5. A method according to claim 1 wherein said solvent is carbon tetrachloride.

6. A method according to claim 1 wherein said solvent is heteroaromatic.

7. A method according to claim 6 wherein said solvent is pyridine.

8. A method according to claim 1 wherein the fullerene mixture is in the form of a solution.

9. A method according to claim 1 wherein the fullerene mixture is soot.

10. A method according to claim 1 wherein said column also comprises silica gel.

11. A method according to claim 10 wherein the ratio by weight of activated carbon to silica gel is 1:2.

12. A method according to claim 1 wherein said aromatic solvent is driven through said column by applying 5 p.s.i. to 5000 p.s.i. to one end of said column.

13. A method according to claim 1, 2, 3, 4, 5, 6, 7, 8, 9, 10, 11, or 12 wherein the fullerene of selectted molecular weight is a $C_{60}$ fullerene.

14. A method according to claim 1, 2, 3, 4, 5, 6, 7, 8, 9, 10, 11, or 12 wherein the fullerene of selectted molecular weight is a $C_{70}$ fullerene.

* * * * *

UNITED STATES PATENT AND TRADEMARK OFFICE
CERTIFICATE OF CORRECTION

PATENT NO. : 5,310,532

DATED : May 10, 1994

INVENTOR(S) : Tour et al.

It is certified that error appears in the above-indentified patent and that said Letters Patent is hereby corrected as shown below:

Page 1, under "Other Publications", add the following references:

Ajie et al; J. Phys. Chem., 94, 8630-8633 (1990)

Chatterjee et al; J. Org. Chem., 57, 3253-3254 (1992)

Khemani et al; J. Org. Chem., 57, 3254-3256 (1992)

Diederich et al; Science, Vol. 254, 1768-1770 (12/20/91)

Diederich et al; Science, Vol. 252, 548-551 (4/26/91)

Hare et al; Chem. Phys. Lett., 177, 394-398 (3/1/91)

Haufler et al; J. Phys. Chem., 94, 8634-8636 (1990)

Howard et al; Nature, Vol. 352, 139-141 (7/11/91)

Jinno et al; J. Chromatogr., 594, 105-109 (3/6/92)

Koch et al; J. Org. Chem., 56, 4543-4545 (1991)

Krätschmer et al; Chem. Phys. Lett., 170, 167-170 (1990)

Krätschmer et al; Nature, Vol. 347, 354-358 (1990)

Kroto et al; Nature, Vol. 318, 162-163 (1985)

Meier et al; J. Org. Chem., 57, 1924-1926 (3/13/92)

UNITED STATES PATENT AND TRADEMARK OFFICE
CERTIFICATE OF CORRECTION

PATENT NO. : 5,310,532

DATED : May 10, 1994

INVENTOR(S) : Tour et al.

It is certified that error appears in the above-indentified patent and that said Letters Patent is hereby corrected as shown below:

Parker et al; J. Am. Chem. Soc., 113, 7499-7503 (1991)

Peters et al; Angew. Chem. Int. Ed. Engl. 31, 223-224 (1992)

Pradeep et al; Mat. Res. Bull., 26, 1101-1105 (1991)

Pradeep et al; J. Am. Chem. Soc., 114, 2272-2273 (1992)

Shinohara et al; J. Phys. Chem., 95, 8449-8451 (10/31/91)

Still et al; J. Org. Chem., 43, 2923-2925 (1978)

Taylor et al.; J. Chem. Soc. Commun., 20, 1423-1425 (1990)

Vassallo et al; J. Chem. Soc. Commun., 1, 60-61 (1/1/92)

Zhennan et al.; J. Phys. Chem., 95, 9615-9618 (11/28/91)

Giddings et al; Advances In Chromatography, Volume 4, 127-143 (1967)

UNITED STATES PATENT AND TRADEMARK OFFICE
CERTIFICATE OF CORRECTION

PATENT NO. : 5,310,532

DATED : May 10, 1994

INVENTOR(S) : Tour et al.

It is certified that error appears in the above-indentified patent and that said Letters Patent is hereby corrected as shown below:

Baum, Rudy M.; Chem. & Eng. News, 25-31, June 1, 1992

Kirk and Othmer, Encyclopedia of Chemical Technology, Volume 2, 886-890 (1948)

McLafferty, F.W., Acc. Chem. Res., 25, 97-175 (3/92)

Signed and Sealed this

Sixth Day of December, 1994

Attest:

BRUCE LEHMAN

Attesting Officer    Commissioner of Patents and Trademarks